Jan. 20, 1970     H. KABEL     3,490,104
CABLE CLAMPS
Filed Feb. 29, 1968
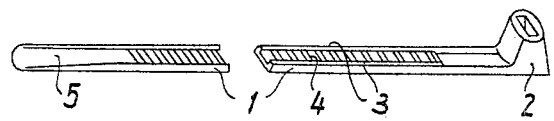
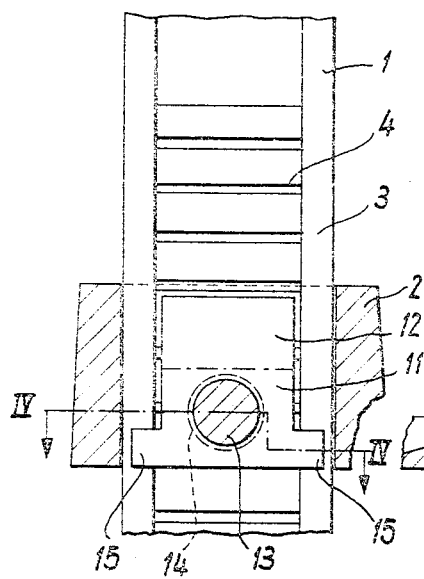
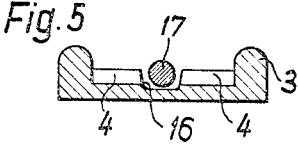
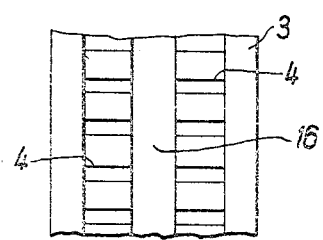
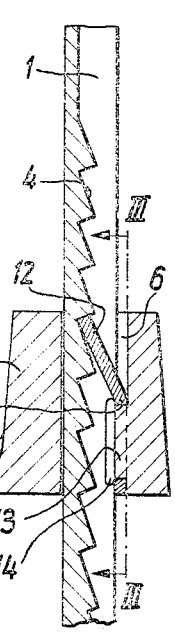
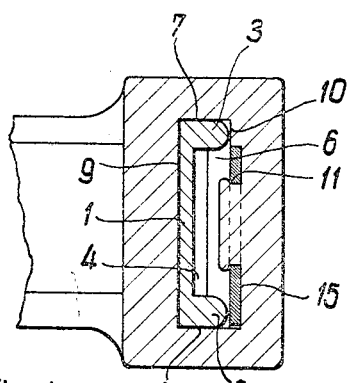

United States Patent Office 3,490,104
Patented Jan. 20, 1970

3,490,104
CABLE CLAMPS
Heinrich Kabel, Quickborn, Germany, assignor to Paul Hellermann G.m.b.H., Pinneberg, Germany
Filed Feb. 29, 1968, Ser. No. 709,271
Claims priority, application Germany, Mar. 3, 1967, H 62,016
Int. Cl. B65d 63/16
U.S. Cl. 24—16                    4 Claims

ABSTRACT OF THE DISCLOSURE

A cable clamp comprises a strap having at one end a lock member into which the other end of the strap can be inserted. To restrain the inserted end from removal one face of the strap is provided with teeth which are engaged by the front end of a metal locking tongue inside the lock member, the rear end of which tongue is supported on at least one continuous rib which projects at least to the height of the teeth from the toothed side of the strap.

---

This invention relates to a cable clamp, consisting of a strap provided with teeth on one side, and having a lock member at one end for accommodating and retaining the other end of the strap, in which lock member there is provided a flexible locking tongue, whose rear end is fastened to the wall of a guide channel formed in the locking member and which projects into the channel to engage with its front part in the teeth of the strap against the direction of disengagement.

Cable clamps of this type are known in the form (French patent specification 1,126,581, USA patent specification 3,127,648), that the flexible locking tongue is formed in one piece with the rest of the device consisting of flexible plastics material. It has also been proved that such cable clamps are suitable for withstanding only limited forces, as the flexible locking tongues made of plastics give way under relatively slight forces.

A cable clamp is known, in which the strap is not provided with teeth, but a sharp locking tongue consisting of metal is let into the lock member, which tongue has its sharp end projecting into the guide channel to bite into the smooth strap surface. This cable clamp is therefore relatively expensive, because the locking tongue must be held very securely and tightly in the lock member, which can only be achieved by letting it into the material of the body of the lock member, for example by being injected in during moulding (British patent specification 1,035,143).

An object of the present invention is to provide a cable clamp of the type mentioned previously, whose tightness is better than the known devices with plastics tongues, whose production is however cheaper and simpler than the known devices with metal tongues.

The solution according to the invention consists in that on the toothed side of the strap near the teeth there are provided one or more untoothed, continuous ribs for supporting the rear end of the teeth, which ribs are at least as high as the teeth, in that the locking tongue is a metal tongue projecting obliquely to the direction of the strap into the guide channel, and whose rear end is supported on the ribs of the accommodated strap.

If it is desired merely to fasten the metal tongue on the wall of the guide channel, then the fastening device should be made so strong, that the very substantial bending forces acting on the tongue, can be taken up by the fastening device. Such a fastening device would without doubt be quite complicated. The already mentioned known form of embodiment has only proved good, in which the tongue is let into the lock member material. The invention depends on the knowledge, that the arrangements for fastening the tongues on the wall of the guide channel can be kept extraordinarily simple, if they are relieved of the bending force of the tongue and are only subjected too thrust stresses. The invention further depends on the knowledge, that such a relief is possible, if the rear end of the tongue is supported on the strap itself where this is accommodated by the lock member.

A particularly advantageous embodiment of the invention consists in that the strap has a continuous rib on each side of the teeth, and that the rear end of the tongue has projections extending laterally over the ribs of the strap accommodated by the guide channel.

The guide channel thus advantageously is of a width which corresponds to the thickness of the strap in the region of the ribs and in addition corresponds to the height of those parts of the tongue which are supported on the ribs.

An advantageous device for fastening the metal tongues on the wall of the guide channel consists in that the wall of the guide channel has a projecting stud which fits into an aperture in the rear end of the tongue, which stud becomes thicker in its part projecting out of the tongue aperture. Either the thickening can be produced by plastically deforming the outwardly projecting part after the application of the tongue, in the manner of a rivet, or the pin can be manufactured with a thickened portion and the tongue aperture can be elastically deformed to pass thereover.

A specific embodiment of the invention will now be described by way of example with reference to the accompanying drawings in which:

FIGURE 1 shows a general view in perspective of a cable clamp.

FIGURE 2 shows an enlarged longitudinal section through the lock member with the end of the strap accommodated therein;

FIGURE 3 shows a section taken along the line III—III in FIGURE 2;

FIGURE 4 shows a section taken along the line IV—IV in FIGURE 3;

FIGURE 5 shows a cross section, and

FIGURE 6 shows a plan view from above of a portion of a modified strap.

As shown in the drawings the cable clamp consists of a strap 1 and a lock member 2, which are made in one piece. The strap part 1 has at the edges of one of its plane surfaces, raised ribs 3, which flank a toothed central region 4. So as to facilitate the insertion of the strap, the end 5 is made without teeth and the ribs 3 decrease in height towards the end.

The lock member 2 is made in one piece with the strap 1 and includes a guide channel 6 for the strap 1, in which the strap can easily be inserted without a tool, but should be properly secured against return movement.

The cable clamp consists for such purposes of known materials of good flexibility and high strength, for example nylon.

The components relating to the securing of the strap 1 in the lock member 2 are shown in the enlarged representations in FIGURES 2, 3 and 4.

The guide channel 6 has surfaces 7, 8, 9 and 10 (FIGURE 4) which guide the strap 1. The guide surfaces 10 are formed by projections on the lateral edge of the side of the channel, which is opposite the side 9. Only one projection can be seen at the top in FIGURE 4. It is understood however, that the channel is formed symmetrically. The central region of the side of the channel opposite side 9 is set back to accommodate a fastening portion 11 of a flexible locking tongue 12. The fastening portion 11 of the locking tongue has a central aperture for accommodating a projecting stud 13, whose projecting end 14 is widened out like a rivet through deformation of the stud after insertion of the locking tongue. The locking tongue is in this way securely fastened in the lock member.

The fastening portion 11 of the locking tongue has, as can be seen in FIGURE 3, two lateral projections 15 on the rear end, one of which is shown in section at the bottom of FIGURE 4. These projections 15 extend over the edge ribs 3 of the strap 1. The channel projections, which form the guide surfaces 10, are cut away in the region of the tongue projections 15 so as to provide room for said projections 15. The tongue projections 15 have substantially the same thickness as these channel projections, so that they assist in the guiding of the strap, as can be seen at the bottom of FIGURE 4.

The tongue portion 12 is bent over in relation to the fastening portion 11 in such a way (FIGURE 2) that it projects obliquely into the guide channel, against the direction of disengagement of the strap. When the strap is inserted, in the guide channel, the tongue portion 12 rests under tension on the toothed zone 4 of the strap 1 and engages barb-like between the teeth 4 of this toothed zone, The shape of the teeth can be adapted to that of the front edge of the tongue. Thus even in the event of considerable stressing, the tongue 12 does not lift from the teeth, if the prestressing is high. Under this prestressing however a moment is produced, which tries to lift the fastening portion 11 at its lower end in FIGURE 2 from the associated channel wall. This moment is taken up in that the tongue projections 15 are supported on the ribs 3 of the strap 1. The fastening stud 13 does not therefore need to receive this moment; it is rathermore subjected only to thrust stresses.

Practice frequently requires, that cable clamps of the present type should be detachable and reusable. This requirement has as yet only been insufficiently met in known constructions. In accordance with an optional feature of the invention it can be met in that the strap can have a groove 16 extending on the toothed side in longitudinal direction, the base of which groove is not higher than the tooth base. This modified construction is shown in FIGURES 5 and 6. Thus the groove 16 in the centre of the teeth 4 makes it possible easily to insert a needle or like tool 17 through the teeth into the lock member and in this way lift the tongue 12 away from the teeth. To enable the needle 17 to engage more easily under the tongue 12, the bottom of the groove is advantageously made deeper than the base of the teeth.

I claim:
1. A cable clamp, comprising a strap provided with teeth on one side, and a lock member at one end for accommodating and retaining the other end of the strap, in which lock member there is provided a flexible locking tongue, whose rear end is fastened to the wall of a guide channel formed in the lock member and which projects into the channel to engage with its front part in the teeth of the strap against the direction of disengagement, wherein there is provided on the toothed side of the strap near the teeth at least one untoothed, continuous rib for supporting the rear end of the tongue, each rib being at least as high as the teeth, and wherein the locking tongue is a metal tongue projecting obliquely to the direction of the strap into the guide channel with its rear end supported on the ribs of the accommodated strap.

2. A cable clamp as claimed in claim 1, wherein a continuous rib is provided on each side of the teeth, and that the rear end of the tongue has lateral projections extending over the ribs of the strap accommodated by the guide channel.

3. A cable clamp as claimed in claim 1, wherein the wall of the guide channel has a projecting stud which fits into an aperture of the rear end of the tongue, which stud becomes thicker in its part projecting out of the tongue aperture.

4. A cable clamp as claimed in claim 1, wherein the strap has on the toothed side a longitudinally extending groove for the insertion of a tool, the base of which groove is not higher than the tooth base.

References Cited
UNITED STATES PATENTS

| | | |
|---|---|---|
| 3,102,311 | 9/1963 | Martin et al. |
| 3,127,648 | 4/1964 | Emery. |
| 3,186,047 | 6/1965 | Schwester et al. |

DONALD A. GRIFFIN, Primary Examiner